US005217703A

United States Patent [19]
Goodson

[11] Patent Number: 5,217,703
[45] Date of Patent: Jun. 8, 1993

[54] METHOD OF MANUFACTURE OF IRON OXIDE PARTICLES

[75] Inventor: Forrest R. Goodson, San Jose, Calif.

[73] Assignee: United Technologies Corporation, Hartford, Conn.

[21] Appl. No.: 751,044

[22] Filed: Aug. 28, 1991

[51] Int. Cl.$^5$ .................................................. C01G 49/02
[52] U.S. Cl. .................................... 423/633; 252/62.56
[58] Field of Search ..................... 423/632, 633, 634; 252/62.56

[56] References Cited

U.S. PATENT DOCUMENTS

| | | | |
|---|---|---|---|
| 1,967,235 | 7/1934 | Ferkel | 423/633 |
| 2,772,956 | 12/1956 | West et al. | 75/0.5 |
| 2,851,347 | 9/1958 | Schlecht et al. | 75/0.5 |
| 2,900,245 | 8/1959 | Beller | 75/0.5 |
| 2,938,781 | 5/1960 | Schmeckenbecher | 75/0.5 |
| 3,325,252 | 6/1967 | Wikswo et al. | 423/633 |
| 3,361,525 | 1/1968 | DeRycke et al. | 423/633 |
| 3,954,945 | 5/1976 | Lange et al. | 423/633 |
| 4,056,386 | 11/1977 | McEwan et al. | 75/0.5 BA |
| 4,073,874 | 2/1978 | Fukushima | 423/500 |
| 4,145,301 | 3/1979 | Bruylants et al. | 252/62.56 |
| 4,424,085 | 1/1984 | Fukuma et al. | 149/19.1 |
| 4,608,239 | 8/1986 | Devon | 423/210 |
| 4,652,305 | 3/1987 | Ebenhoech et al. | 75/0.5 BA |
| 4,826,671 | 5/1989 | Arndt et al. | 423/633 |
| 4,854,981 | 8/1989 | Goodson et al. | 149/2 |
| 4,881,994 | 11/1989 | Rudy et al. | 149/109.4 |
| 5,047,382 | 9/1991 | Rudy et al. | 502/325 |

OTHER PUBLICATIONS

G. D. Ulrich; J. W. Diehl "Aggregation and Growth of Submicron Oxide Particles in Flames", pp. 257-265, May 1982.
V. G. Syrkin, N. E. Polushkina "Preparation of Highly Dispersed Ferric Oxide Powder of Uniform Particle Size by the Carbonyl Method", Poroshykoraya Metallurgiya, No. 4(52), pp. 1-7, Apr., 1967.
Gail D. Ulrich, "Theory of Particle Formation and Growth in Oxide Synthesis Flames", Combustion Science and Technology, 1971, vol. 4.
G. D. Ulrich, N. J. Subramanian, "Particle Growth in Flames Coalescence as a Rate Controlling Process", Combustion Science and Technology, 1977, vol. 17, pp. 119-126.

Primary Examiner—Michael Lewis
Assistant Examiner—Stephen G. Kalinchak
Attorney, Agent, or Firm—Alan C. Cohen

[57] ABSTRACT

The present invention discloses a novel injector for the introduction of iron-containing vapor into a stream of heated oxidized gas wherein the injector has a least two passageways, one for the passage of the iron compound containing vapor and the other for the passage of an insulating gas.

8 Claims, 1 Drawing Sheet

METHOD OF MANUFACTURE OF IRON OXIDE PARTICLES

DESCRIPTION

1. Technical Field

The technical field to which this invention pertains is the manufacture of iron oxide particles through the oxidation of an iron-containing compound. More particularly, the production of superfine iron oxide particles and the use of injectors to introduce the iron-containing compound into the oxidizing gas stream.

2. Background of the Invention

Superfine iron oxide particles have been manufactured by the process of introducing a vaporized iron-containing compound through an injector into a stream of hot oxidizing gas. Upon contact with the hot oxidizing gas, the vaporized iron-containing compound spontaneously oxidizes to form iron oxide particles. Generally, these particles, which range in size from about 100 Å or preferably below about 50 Å, are collected in an electrostatic precipitator.

Over time, it has been determined that one of the variables which was critical to the production of a very high conversion rate and a consistently uniform particle size was the ability to maintain the iron-containing compound vapor in a state whereby the resulting iron oxide particles were not so close to one another that they would likely contact one another as they pass through the reaction chamber and thereby accrete to form larger, undesirable particles. This dilution was achieved first by introducing the vaporized iron-containing compound with an unheated stream of oxidizing gas prior to this diluted stream being introduced into the heated oxidation stream. This technology is disclosed in U.S. patent application Ser. No. 283,117, now U.S. Pat. No. 5,047,382 which is commonly assigned and the contents of which are incorporated herein by reference. This dilution resulted in less agglomeration of the iron oxide particles as they travelled through the remainder of the manufacturing process.

An alternative method was developed (and is disclosed in pending U.S. patent application Ser. No. 07/618,772 which is also commonly assigned and the contents of which are also incorporated by reference herein) in which the vaporized iron-containing compound is introduced directly into the heated oxidizing gas stream through an insulated injector such that the iron-containing compound remains cool prior to its introduction to the heated oxidizing gas stream. This helped to suppress premature oxidation of the iron-containing compound and maintained the reaction site in the center of the oxidizing stream.

However, as successful as these inventions have been, there still remain significant problems, not with the conversion of the iron-containing compound to iron oxide particles but with the harvesting processes after the particles have been produced. In addition, it has been discovered that the materials useful in the manufacture of the insulated injectors are generally brittle or otherwise difficult to handle.

One problem which arises during the harvesting or removal of the iron oxide particles from the electrostatic precipitator is that during this time the flow of air or other gases is interrupted to avoid waste. In particular, the flow of the vaporized iron-containing compound through the injector is stopped. Because heat continues to be transferred through the insulation and the internal passage of the injector is no longer cooled by flow of carrier gas, the temperature of the internal passage can rise sufficiently to cause pyrolysis of the iron-containing compound during restart-up with consequent fouling or obstruction of the injector. This problem may be overcome by shutting off the flow of heated oxidizing gas. However, this then necessitates a longer restart-up time due to the added time required to attain the proper operating temperatures for the oxidizing gas and attendant equipment. All of these steps result in a cumbersome, shut-down and start-up of the operation which creates significant down time. To avoid this loss of production time what is needed in this art is an improvement to the method which would permit the harvesting of the iron oxide particles without the attendant problems associated with the present method requiring shut-down of the system. Description of the Invention The present invention is directed toward an improved method for the manufacture of iron oxide particles wherein the method comprises introducing a stream of vaporized iron-containing compound into a heated stream of oxidizing gas wherein the iron-containing compound is thereby oxidized to form iron oxide particles. The resulting particles are then passed through a precipitator and collected. The improvement comprises the use of a novel injector for the introduction of the vaporized iron-containing compound into the heated oxidizing gas stream wherein the injector has at least two passageways the first passageway connecting the source of the iron-containing compound vapor with the heated oxidation gas and a second passageway positioned co-axially about the first passageway wherein a cooling gas is passed through the second passageway to maintain the temperature of the iron-containing gas at a temperature below its oxidation or pyrolysis temperature. The cooling gas is also then introduced into the heated oxidation gas stream.

Also disclosed is an apparatus for use with the method of the present invention.

BEST MODE FOR CARRYING OUT THE INVENTION

Figure 1:
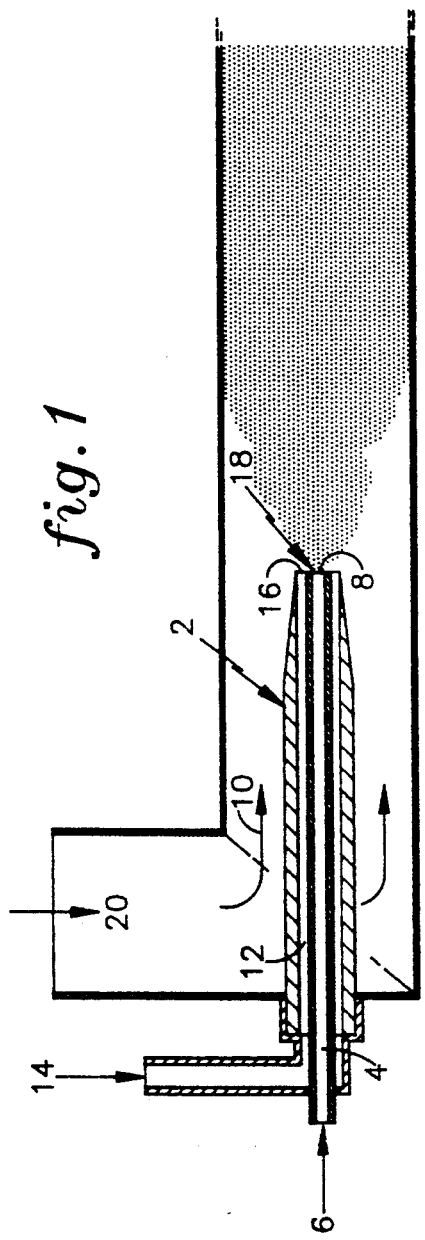
FIG. 1 is a cross-sectional view of the present method of manufacture.

The method for manufacture of iron oxide particles of the type desired herein comprises a source of oxidizing gas i.e., air or oxygen which is heated to a temperature sufficient to spontaneously oxidize a vaporized stream of an iron-containing compound upon contact to superfine iron oxide particles having average particle sizes below about 100 Å. In fact, iron oxide particles may be produced having an average particle size of about 50 Å or less using this method. Such iron-containing compounds which will undergo such reaction resulting in the desirable iron oxide particles are well known in the art, the most desirable being iron pentacarbonyl. Generally any iron-containing compound that is capable of being vaporized without significant decomposition at a temperature below about 500° C. and is capable of reacting at temperature below about 500° C. with an oxygen-containing atmosphere to form ferric oxide as the exclusive solid product (i.e., is susceptible to oxidation) may be used in this invention. It is important that the compound be capable of being vaporized without decomposition at a temperature below about 500° C. because that most finely divided (e.g., smallest particle size) product is obtained only if the iron atoms in the starting material are spatially widely separated. If they are closely associated, as in a condensed (i.e., solid or liquid) compound, the particles of the product of oxidation will contain many iron atoms (i.e., the iron oxide particles will be relatively large). It is important that the compound be capable of reacting at temperature below about 500° C. with an oxygen-containing atmosphere to form ferric oxide as the exclusive solid product because unconverted starting material or solid products other than ferric oxide are likely to be inferior burning rate catalysts and to exert harmful effects on propellant properties other than burning rate (e.g., shortened pot life and impaired aging stability). At temperature above 500° C. agglomeration and sintering of the oxidation product will occur with loss of specific surface area resulting in reduced catalytic activity.

It is also preferred that the iron-containing compound have a high iron content to increase the yield of the desired iron oxide product. Finally, it is preferred that the iron-containing compound be essentially free of any impurities that will not react to form harmless gases in the oxidation step. In particular, impurities containing metals other than iron are usually very undesirable.

It is especially preferred to employ compounds containing only the elements carbon, hydrogen, nitrogen and oxygen in addition to iron. The presence of halogens, sulfur, phosphorous and boron is undesirable because it interferes with the complete conversion to the oxide. In addition, phosphorous, boron and sulfur can form a glassy product or undesired solid residue that coats the iron oxide.

Preferred generic classes of iron-containing compounds are carbonyls, chelates of beta diketones, complex cyanides and ferrocene derivatives. These are preferred because they contain adequate concentrations of iron, exhibit the required volatility and thermal stability, and oxide readily at elevated temperatures to form as a solid product only ferric oxide. Exemplary compounds include ferric acetylacetonate, ferrous ferrocyanide and ferrocenes (e.g., lower alkyl), The resulting particles are generally removed from the reaction stream after oxidation by passing them through a conventional electrostatic precipitator. This process as well as the means to achieve such an operation and the operating parameters are known to those skilled in the art and need not be reiterated herein (i.e., see U.S. Pat. No. 4,854,981 which is commonly assigned and the contents of which are incorporated herein by reference). However, what is not taught in the art is the improved injector means to introduce the vaporized iron-containing compound into the heated oxidizing gas stream.

The novel injector comprises a housing in which there are at least two passageways: a first passageway and a second passageway. Typically, these passageways will be positioned to pass longitudinally through the injector housing and each passageway will have an inlet and an outlet. Also, the second passageway will be positioned coaxially to the first passageway. The purpose of the first passageway is to provide a means for the passage of the vaporized iron-containing compound from its source to where it is introduced into the heated oxidizing gas stream. The purpose of the second passageway is to permit a continuous flow of cool insulating gas which will assist in maintaining the temperature of the iron-containing gas below its decomposition or oxidation temperature until it enters the heated oxidizing gas stream.

Preferably the outlets for both passageways will be positioned such that the gases exiting both passages will exit coaxially. Additionally, it is preferred that the injector be positioned such that the gases exiting the injector do so coaxially with the stream of heated oxidizing gas. This will result in a number of advantages. First, when the two gases exit the injector they will have an opportunity to mix together prior to being heated or coming in contact with the heated oxidizing gas. This dilution of the iron-containing compound prior to oxidation will result in consistency of particle size through a decreased opportunity for the resulting oxide particles to come in contact with one another and aggregate forming larger particles. Secondly, as the insulating gas exits the second passageway it will reduce the pressure at the outlet of the first passageway (due to the Bernoulli Principle), thereby preventing oxygen from entering the injector and causing premature oxidation of the vapor with catastrophic effect.

Figure 2:
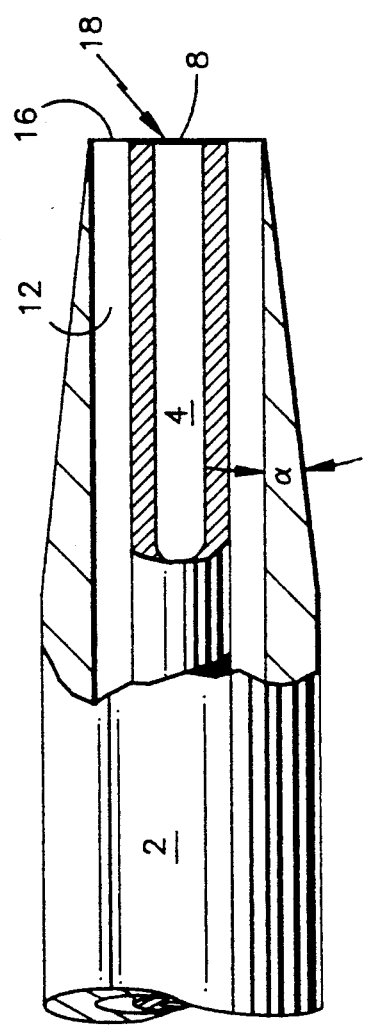
FIG. 2 is a cross-sectional view of an injector of the present invention.

Referring now to FIGS. 1 and 2 which represent one embodiment of the present invention and are meant to be exemplary and not limiting.

The injector depicted in these FIGS. may be comprised of any material which can be formed to contain the passages, will not be detrimentally affected by the materials used in the process and will be able to operate in the environment in which it will be used. Metal, preferably steel, and most preferably stainless steel are the materials of choice. However, other materials which can meet these criteria may also be used such as ceramics or heat resistant reinforced plastics. The injector may be formed from a single piece of material having the passageways machined through the material or it could be fashioned of two or more tubular pieces, one tube larger than the other to form the passageways. Such methods and other equivalents would be known to those artisans skilled in such arts and need not be specifically listed here.

As may be seen in FIGS. 1 and 2, the injector 2 has a first passageway 4 positioned along the longitudinal axis of the injector. The passageway 4 has an inlet 6 to permit the introduction of the iron-containing compound vapor and an outlet 8 where the iron-containing compound exits the injector and is introduced coaxially to the heated oxidizing gas stream 10. A second passageway 12 is also formed along the longitudinal axis of the injector and is also positioned coaxially about the first passageway 4. The second passageway also has an inlet 14 and an outlet 16 to permit a flow of insulating gas to be introduced from a source (not shown) through the passageway to the outlet 16 and into the heated oxidizing gas stream 10.

The injector may have optional insulation material positioned either about the outside of the injector or between the two passageways if desired. Again, standard insulating materials may be used so long as they are compatible with the operating temperatures and materials used in the process.

Also, in order to improve the aerodynamics of the exiting gases from the injector the tip of the injector may be faired to reduce turbulence created from the mixing of the three gas streams as they come in contact immediately surrounding the tip 18 of the injector. In addition, the insulating gas flowing from the outlet 16 acts as an aspirator. Thus, should the flow of inert carrier gas be interrupted, the aspiration would oppose the flow of oxygen gas (either from the coaxial outer duct or from the heated oxidizing gas stream) into the source of iron carbonyl vapor. Since iron carbonyl is extremely flammable, such a safety feature is very important. Further, such a taper would favor streamlined flow of the hot oxidizing gas about the injection tip, thereby minimizing recirculation of the gases at the injector tip. Such recirculation increases the residence time and favors depositforming pyrolysis and oxidation at the critical locations which would impair the efficiency of the iron oxide product. The taper (depicted as the angle alpha) should preferably be between about 5 to 15 degrees.

The size of the passages is not critical except that one does not want to have so small a passageway that so little of either gas is able to pass through that the process is affected either because there is not enough iron-containing compound to produce an acceptable amount of product or that excessive pressure would be required to provide sufficient insulating gas flow to maintain the temperature of the iron-containing compound gas at the desired temperature. The actual flows will be subject to individual design requirements for the overall apparatus and may be determined either theoretically once the design is settled upon or through simple experimentation.

The method for manufacturing the iron oxide particles may be explained by referring to FIG. 1. A heated stream of oxidizing gas (typically air or oxygen) is introduced into the reaction chamber 20. Typically, the oxidizing gas has a temperature of between 300° F. to about 900° F. The stream may be heated by any conventional means and may be forced into and through the reactor chamber by such means as a fan. At the same time, the iron-containing compound is vaporized in a conventional manner (for example by placing it in a bubbler and bubbling a carrier gas through the liquid or evaporating the compound at a controlled rate) and passed through the first passageway 4 of the injector 2 and exiting the outlet 8 into the heated oxidizing gas stream. Simultaneously, a flow of insulating gas is passed through the second passageway from a source (not shown) into inlet 14 and exiting through outlet 16. As the insulating gas exits the second passageway, it dilutes the iron-containing gas vapor exiting the first passageway prior to the diluted vapor being contacted with and reacted with the heated oxidizing gas to form the iron oxide particles. The insulating gas is preferably an oxidizing gas (i.e., oxygen or air) however, it may be an inert gas as well. As the iron-containing compound vapor contacts the heated oxidizing gas 10, it is converted to iron oxide particles which then are removed by an electrostatic precipitator (not shown).

EXAMPLE

An injector of the type described in the invention was manufactured of an outer 304 stainless steel, cylindrical jacket 12 inches long, having an outer diameter of 1.0 inch and a wall thickness of 0.060 inch. This jacket was fitted with a tapered, conical stainless steel nose piece having an outer dimension of 1.0 inch tapering down to 0.50 inch at an angle of 5° F., the nose piece being 1.5 inch long.

A tube was positioned inside the jacket and coaxial to it by a centering a bushing located at the upstream end of the assembly. The tube was also formed of 304 stainless steel and was 12 inches long, and had an outer diameter of 0.3125 inch and a wall thickness of 0.030 inch. The tube formed the first passageway for the iron-containing compound vapor while the space between the inner wall of the jacket and the outer wall of the tube formed the second passageway for the insulating gas. The exits for the two passages were positioned coplanar to each other. The injector was mounted concentrically in a 4-inch diameter reactor duct through which heated oxidizing gas (air) was passed.

During operation, hot oxidizing gas was flowed through the reactor duct at 120 CFM at a temperature of 610° F. The iron carbonyl was vaporized at a rate of 19 gram/minute using a nitrogen carrier gas stream of 6 liter/minute and cooling insulating gas (air) at room temperature ($\approx$72° F.) was passed through the second passage at a rate of 3.5 CFM. The injector was operated for 5½ hours. Every 10 minutes, the flow of iron pentacarbonyl was interrupted to permit harvesting of the iron oxide particles from the electrostatic precipitator using flexible hoses and compressed air.

The resulting particles had an average surface area of 277 $m^2$/gm and the crude yield was 1268 gm or 77% of theoretical Post test inspection showed the injector to be deposit-free.

The iron oxide particles produced are generally described as fine or superfine iron oxide particles. Such particles typically have surface areas in excess of about 100 sq. m/gm and have an average particle size of less than 100 Å in diameter. Preferably the particles will be about 50 Å or less in diameter.

Through the use of the novel injector the harvesting of the iron oxide products can be performed in a more streamlined and efficient manner. The heated oxidizing gas can continue to flow and the iron-containing compound vapor stream can be turned off without causing the injector to become unacceptably hot as the flow of insulating gas can continue unabated during this process. This permits harvesting with less shutdown time and start-up time than would otherwise be possible with the prior art apparatus.

Additionally, the flow of cooling gas which creates an "aspirator" effect at the tip of the injector acts as a safety feature preventing oxidizing gas from backing up into the iron-containing compound and possibly causing catastrophic oxidation.

Having thus described the invention, what is claimed is:

1. A method for manufacturing iron oxide particles comprising;
   a. introducing a stream of vaporized iron containing compound through a first passageway of an injector into a heated stream of oxidizing reaction gas in a reaction chamber and thereby causing the iron containing compound to spontaneously oxidize to iron oxide particles;
   b. simultaneously passing an unheated gas through a second passageway of the injector into said reaction chamber wherein said second passageway is positioned parallel to and coaxially about the first passageway
   c. removing the iron oxide particles from the heated oxidizing stream by electrostatic precipitation;
   d. removing the iron oxide particles from the electrostatic precipitator by turning off the flow of vaporized iron containing compound for a period of time while substantially continuing the flow of heated oxidizing gas and unheated gas wherein the flow of unheated gas is sufficient to maintain the temperature of the injector below that of the pyrolysis temperature of the iron containing compound during the period that the vaporized iron oxide is not flowing through the injector.

2. The method of claim 1 wherein the outlet for said second passageway is tapered to provide streamline flow of the heated oxidizing gas and avoid recirculation at or near the first outlet port.

3. The method of claim 1 wherein the iron-containing compound is iron pentacarbonyl.

4. The method of claim 1 wherein the iron-containing compound is a carbonyl, chelate of a beta diketone, complex cyanide or ferrocene compound.

5. The method of claim 1 wherein the unheated gas is a gas capable of oxidizing the iron-containing compound when said gas is heated to a substantially higher temperature.

6. The method of claim 1 wherein the unheated gas is air.

7. The method of claim 1 wherein the unheated gas is a gas which is unable to oxidize the iron-containing compound.

8. The method of claim 1 wherein the flow of gas discharging from the outlet of the second passageway creates a subambient pressure about the outlet of the first passageway thereby preventing an influx of oxidizing gas into the first passageway.

* * * * *

UNITED STATES PATENT AND TRADEMARK OFFICE
CERTIFICATE OF CORRECTION

PATENT NO. : 5,217,703

DATED : June 8, 1993

INVENTOR(S) : Forrest R. Goodson et al

It is certified that error appears in the above-identified patent and that said Letters Patent is hereby corrected as shown below:

On the title page, under item [19], change "Goodson" to --Goodson et al.-- and item [75] should read --Inventor: Forrest R. Goodson, San Jose, Calif., and Thomas P. Rudy, Saratoga, Calif.--.

Signed and Sealed this

Eighth Day of March, 1994

Attest:

BRUCE LEHMAN

Attesting Officer

Commissioner of Patents and Trademarks